(12) United States Patent
Smith, III

(10) Patent No.: US 6,471,250 B2
(45) Date of Patent: Oct. 29, 2002

(54) JUNCTION PLATE ASSEMBLY FOR UNDERSEA HYDRAULIC COUPLINGS

(75) Inventor: Robert E. Smith, III, Missouri City, TX (US)

(73) Assignee: National Coupling Company, Inc., Stafford, TX (US)

(*) Notice: Subject to any disclaimer, the term of this patent is extended or adjusted under 35 U.S.C. 154(b) by 8 days.

(21) Appl. No.: 09/785,101

(22) Filed: Feb. 15, 2001

(65) Prior Publication Data

US 2002/0109352 A1 Aug. 15, 2002

(51) Int. Cl.[7] ............................................. F16L 39/00
(52) U.S. Cl. ..................... 285/124.1; 285/24; 285/308; 285/358; 285/394; 285/314
(58) Field of Search ........................... 285/38, 24, 27, 285/314, 308, 309, 124.1, 124.2, 124.3, 358, 394

(56) References Cited

U.S. PATENT DOCUMENTS

| | | | |
|---|---|---|---|
| 2,129,704 A | 9/1938 | Meyer | |
| 3,201,151 A | 8/1965 | Westveer | |
| 3,214,195 A | * 10/1965 | Zahuranec et al. | 285/124.1 |
| 3,217,746 A | 11/1965 | Voisine | |
| 3,527,480 A | 9/1970 | Larson | |
| 3,551,005 A | 12/1970 | Brun | |
| 3,625,251 A | 12/1971 | Nelson | |
| 3,710,296 A | * 1/1973 | Urani | 337/188 |
| 3,918,485 A | 11/1975 | Weber et al. | |
| 3,960,393 A | * 6/1976 | Hosokawa et al. | 285/124.4 |
| 4,076,279 A | 2/1978 | Klotz et al. | |
| 4,080,025 A | * 3/1978 | Garnier et al. | 285/27 |
| 4,089,549 A | 5/1978 | Vyse et al. | |
| 4,426,104 A | 1/1984 | Hazelrigg | |
| 4,453,566 A | 6/1984 | Henderson, Jr. et al. | |
| 4,460,156 A | 7/1984 | Hazelrigg et al. | |
| 4,597,413 A | 7/1986 | Buseth | |
| 4,637,470 A | 1/1987 | Weathers et al. | |
| 4,666,187 A | 5/1987 | Koot | |
| 4,915,419 A | 4/1990 | Smith, III | |
| 4,925,154 A | 5/1990 | Baker | |
| 5,342,098 A | 8/1994 | Wilkins | |
| 5,829,480 A | 11/1998 | Smith, III | |
| 5,899,228 A | 5/1999 | Smith, III | |
| 5,920,934 A | * 7/1999 | Hannagan et al. | 285/124.1 |
| 6,017,065 A | * 1/2000 | Hellesøe | 285/124.2 |
| 6,106,026 A | 8/2000 | Smith, III | |
| 6,173,742 B1 | 1/2001 | Smith, III | |

* cited by examiner

Primary Examiner—Lynne H. Browne
Assistant Examiner—Aaron M Dunwoody
(74) Attorney, Agent, or Firm—Trop, Pruner & Hu, P.C.

(57) ABSTRACT

An apparatus for moving together simultaneously male and female coupling members attached to manifold or junction plates is disclosed. The apparatus includes a sloped cam surface on the first or lower junction plate, and a central shaft having a cam follower that moves up the sloped cam surface to urge the two junction plates together, and thereby connect male and female coupling members.

16 Claims, 3 Drawing Sheets

JUNCTION PLATE ASSEMBLY FOR UNDERSEA HYDRAULIC COUPLINGS

BACKGROUND OF THE INVENTION

1. Field of the Invention

This present invention relates to hydraulic couplings used in undersea drilling and production applications and junction plates used to support the opposing members of the coupling. More particularly, the invention involves a junction plate assembly configured to bring the male and female coupling members into engagement or disengagement at remote subsea locations.

2. Description of Related Art

Subsea hydraulic couplings are old in the art. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. Subsea hydraulic couplings are shown, for example, in U.S. Patents issued to Robert E. Smith III assigned to National Coupling Company Inc. of Stafford, Tex.

The male member includes a cylindrical body with a probe section approximately equal to the diameter of the female member bore, and a connection at its other end to facilitate connection to hydraulic lines. When the probe section of the male member is inserted into the bore of the female member, according to various embodiments of the device, fluid flow is established between the male and female members.

A male member and female member are generally connected to opposing junction plates of a manifold and are held together by bolts or hydraulic members attached to the plates. The male member is commonly attached to one junction or manifold plate, while the female member is attached to an opposing plate so as to face the male member and align with it. The male and female members may be attached to the junction plates or manifold plates using various means, such as set screws or threads. Techniques for attaching the members to such plates are well known to those skilled in the art.

Typically, several subsea hydraulic connectors are grouped together on each junction or manifold plate. For example, two or more coupling members may be attached to each opposing plate. In the subsea environment, a diver or remote operating vehicle is used to connect the opposing plates together, and thereby connect the opposing coupling members on each of the plates. The coupling members are typically simultaneously connected and the opposing plates are locked together.

High separational forces are transferred to the opposing junction plates, due to the separational forces of the high pressure hydraulic fluid in each coupling member. In many cases, the plates must be relatively thick and heavy in order to withstand high separational forces. The plates are typically stainless steel and between one and one and one-half inches in thickness.

U.S. Pat. No. 4,915,419 to Robert E. Smith III relates to a sliding lock plate for locking together simultaneously male and female coupling members on opposing junction plates. Various other locking devices have been used or proposed to lock together the male and female coupling members attached to junction plates.

These locking devices lock the coupling members together after the male end coupling members are fully engaged, and do not assist in bringing the male and female members together into full engagement before locking. In many cases, substantial axial forces are needed to bring all the male coupling members on a junction plate into full engagement with the female coupling members on the opposing junction plate. Hydraulic systems at subsea depths are subject to a number of different forces tending to inhibit the connection of male and female coupling members. For example, subsea pressures at significant ocean depths, high hydraulic pressure in the system, and mechanical forces required to open valves and connect junction plates are among the factors of concern. A combination of these forces may result in difficulty simultaneously engaging the male and female coupling members on opposing junction plates, and also result in substantial separational forces after the coupling members are connected.

Attempts have been made to simultaneously bring the junction plates together, including threaded devices. However, threaded connections have the disadvantages of marine growth buildup in the threads and galling of the threads. Another alternative is lock sleeves for bringing together subsea hydraulic connectors. However, lock sleeves are relatively heavy and bulky, which is undesirable in the subsea environment. Other problems are caused by a buildup of silt, ocean debris and marine growth in the lock sleeves. Typically, the lock sleeve systems includes lock sleeves connected to a plate interposed between the male and female junction plates. As the intermediate plate is pulled back, all of the lock sleeves on the coupling members are simultaneously pulled back and then released. The buildup of silt, ocean debris and marine growth may result in jamming the lock sleeves and especially the locking balls.

Accordingly, a simple and highly reliable mechanism is needed for solving the problem of simultaneously bringing male and female coupling members on junction plates into engagement in a subsea environment.

SUMMARY OF THE INVENTION

The present invention overcomes the above mentioned problems and disadvantages by providing a junction plate or manifold plate assembly for hydraulic coupling members, wherein the junction plates are moved together by a cam and cam follower attached to a central shaft. One of the junction plates to which coupling members are connected includes one or more sloping cam surfaces. The central shaft extending between the junction plates has one or more cam followers, which may be rollers or bearings. When the central shaft is rotated, each cam follower moves up the sloped cam surface. The sloped cam surface translates the rotational movement of the central shaft to axial movement to bring the two manifold plates closer together. When the cam follower reaches the end of the sloped cam surface, the male and female coupling members are fully engaged. The rotational movement necessary to bring the junction plates and couplings together may be accomplished by a diver or with a remote operating vehicle at subsea depths.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE PREFERRED EMBODIMENTS

Figure 1:
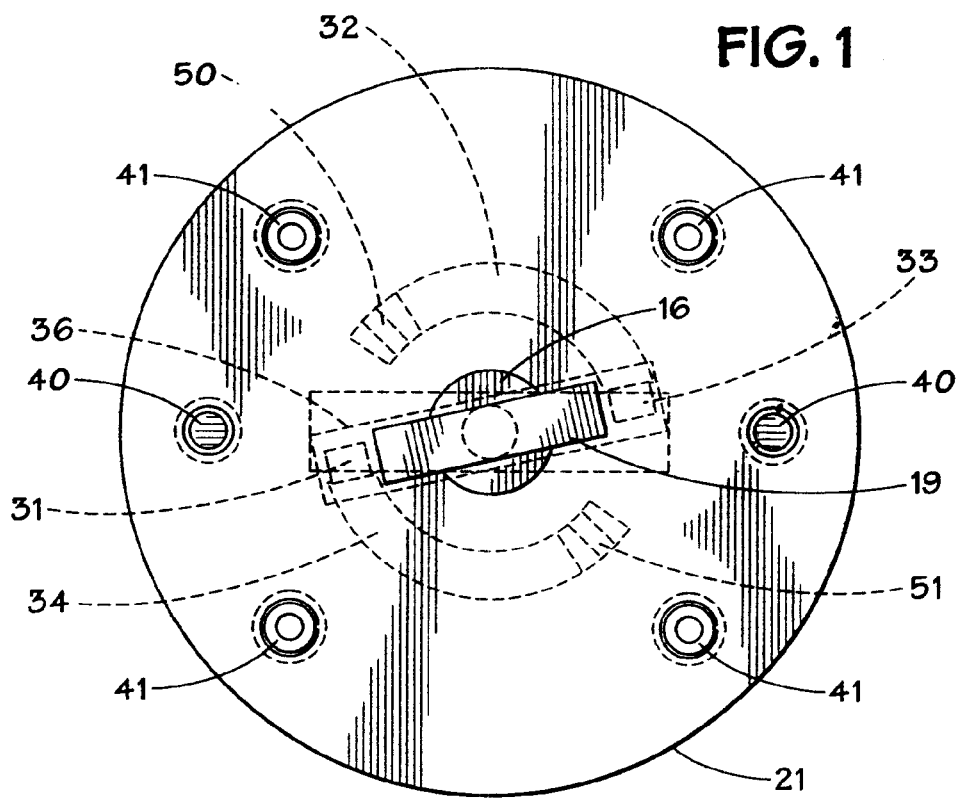
FIG. 1 is a top view of the junction plate assembly according to a preferred embodiment of the present invention, as each cam follower has initially engage the sloped cam surface.
Figure 2:
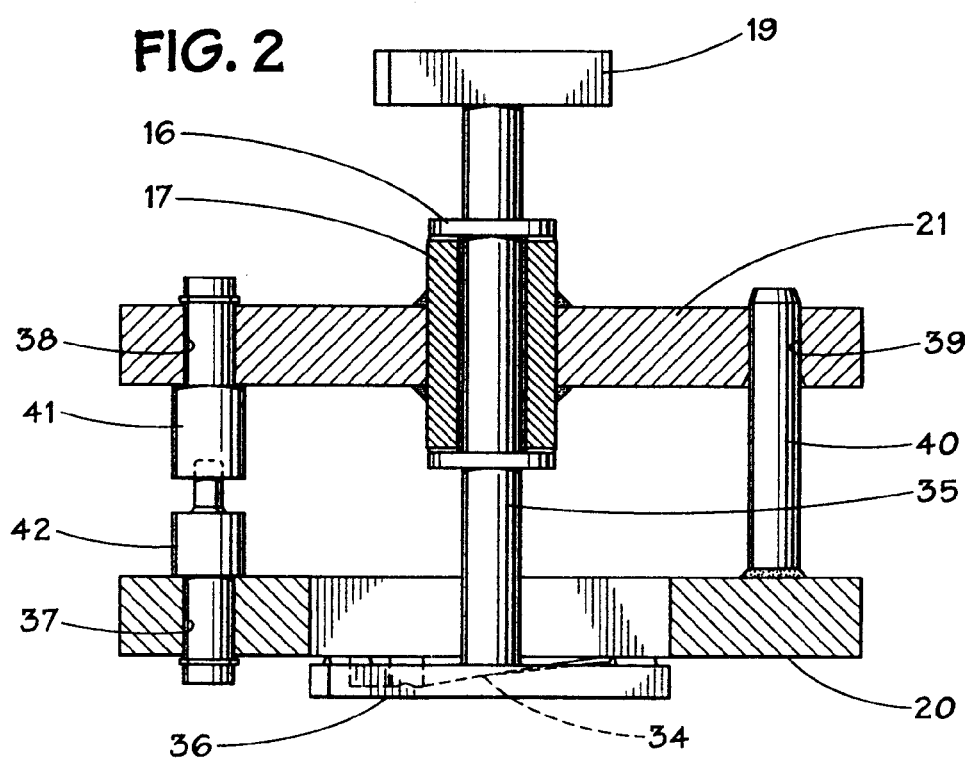
FIG. 2 is a side view, in cross section, of the junction plate assembly according to a preferred embodiment, as each cam follower has initially engage the sloped cam surface.

Referring to FIG. 1 and FIG. 2 of the drawings, a first manifold plate or junction plate 20 is shown having a plurality of cylindrical apertures 37 for connection of male coupling members 42 thereto. Typically, at least two male coupling members are attached to the first junction plate, which is typically the lower junction plate. A male hydraulic line is connected to one end of each male coupling number 42 while the other end of each male coupling member is configured to mate with female coupling member 41 and establish fluid flow therebetween. The second manifold plate or junction plate 21 includes a plurality of cylindrical apertures 38 for connection of female coupling members 41 thereto. In a preferred embodiment, the second manifold plate is the upper plate. Various means may be used to connect the male and female coupling members to the junction plates, as is well known in the art.

One or more guidepins 40 are provided on the first manifold plate 20 to align the two manifold plates during engagement of the male and female coupling members. In a preferred embodiment, guidepin 40 is inserted into and through cylindrical aperture 39 in the upper manifold plate 21.

Central shaft 35 extends between the upper and lower manifold plates. The central shaft is rotatable on its vertical axis to change the spacing between the upper and lower manifold plates. The axis of the central shaft is perpendicular to the face of the first and second manifold plates. One end of the central shaft includes handle 19, which may be used by divers or remote operating vehicles to turn the central shaft and bring the coupling members into engagement, or disengage the coupling members.

In a preferred embodiment, the second manifold plate includes sleeve 17 at its center, and the central shaft extends through the sleeve. A pair of flanges 16 on the central shaft blocks axial movement of the central shaft relative to the second manifold plate. One end of the central shaft includes an arm or lower member 36 perpendicular to the axis of the central shaft. The arm or lower member includes at least one cam follower attached thereto. In a preferred embodiment, the cam followers are rollers or bearings 31, 33, although other cam followers may be used to move on the sloped cam surface and minimize or reduce friction between the cam followers and sloped cam surface 32.

Sloped cam surfaces 32, 34 extend from a face of lower manifold plate 20. In the preferred embodiment, there are two sloped cam surfaces, each forming an arc approximately 120 degrees around the central axis of the manifold plate. In a preferred embodiment, each sloped cam surface provides a rise of approximately one-half inch over the 120 degrees rotation about the vertical axis. To engage the couplings, the central shaft is turned so that each cam follower 31, 33 moves up one of the cam surfaces. This urges the first or lower manifold plate 20 closer to the upper manifold plate, thereby engaging the male and female coupling members.

Figure 3:
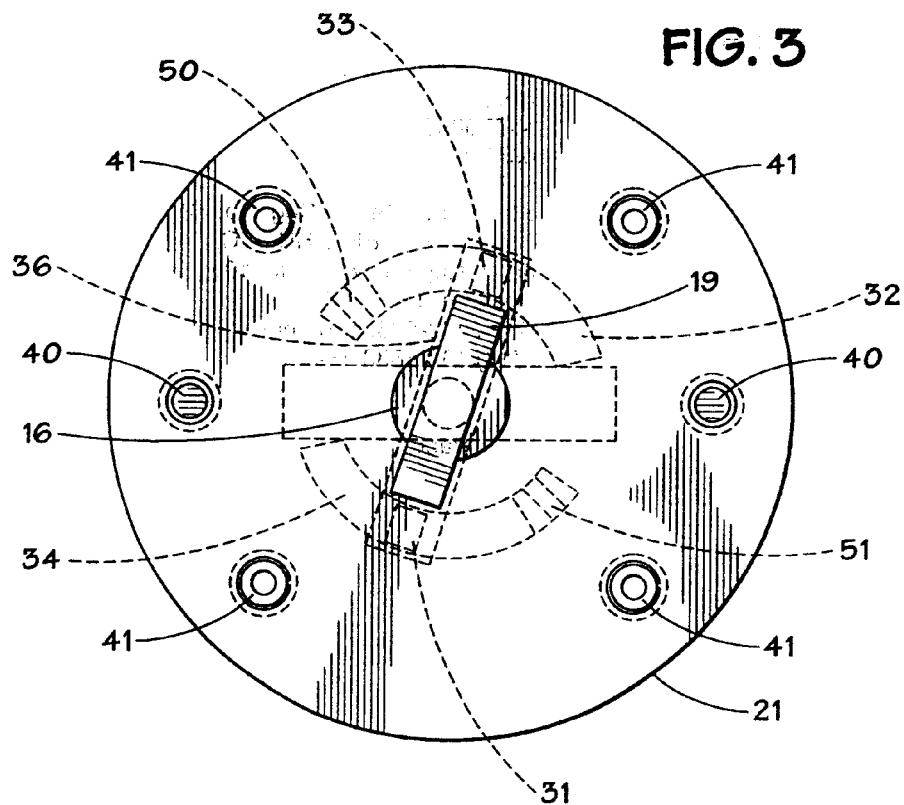
FIG. 3 is a top view of the junction plate assembly according to a preferred embodiment, as each cam follower has moved approximately half way up the sloped cam surface.
Figure 4:
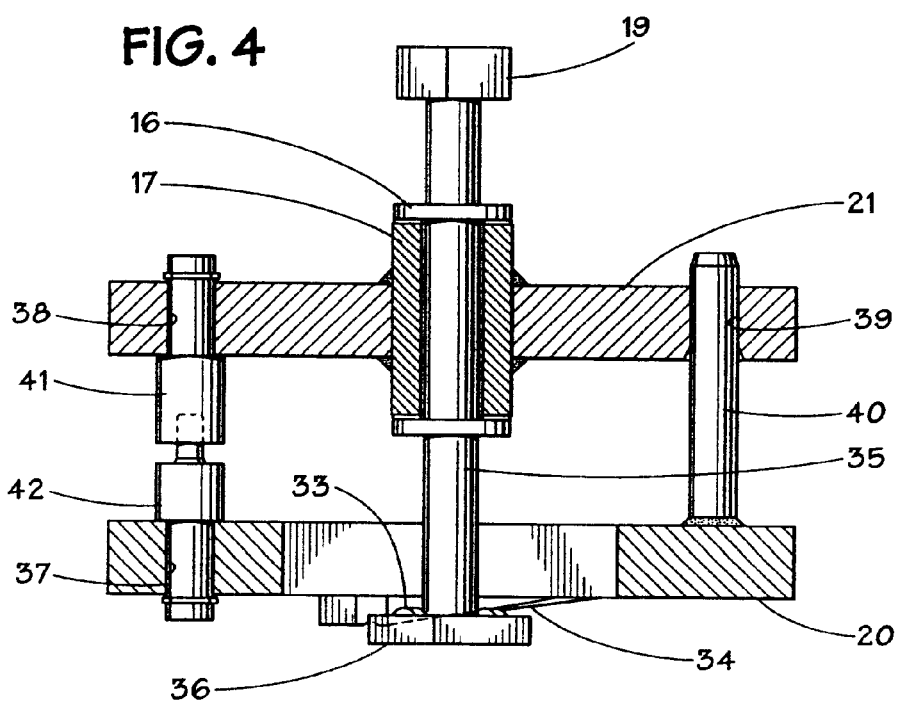
FIG. 4 is a side view, in cross section, of the junction plate assembly according to a preferred embodiment, with each cam follower approximately half way up the sloped cam surface.
Figure 5:
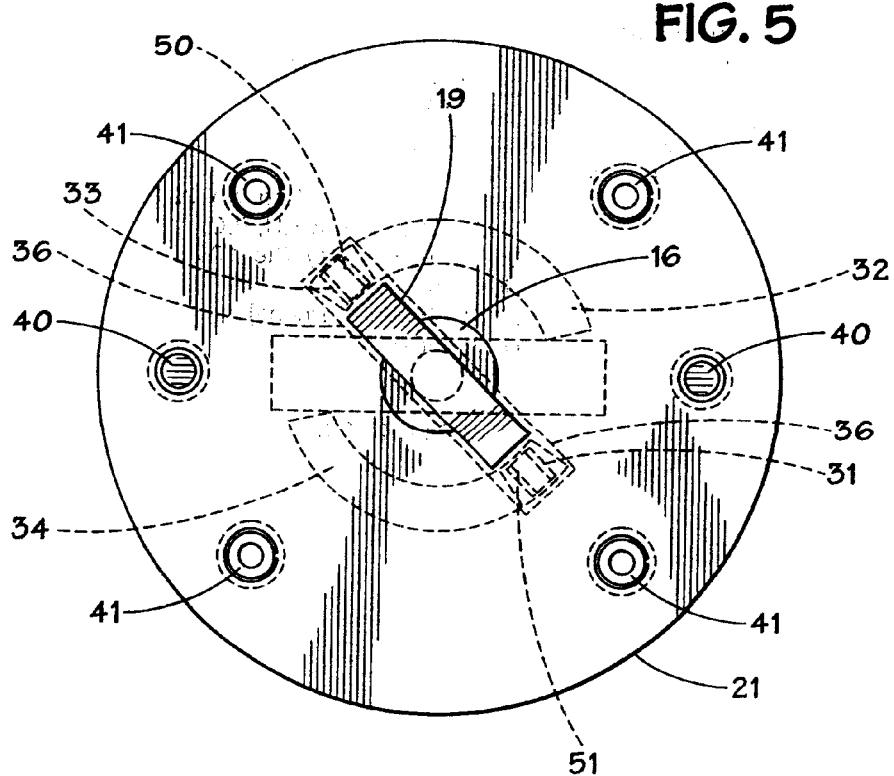
FIG. 5 is a top view of the junction plate assembly according to a preferred embodiment with each cam follower at the end of the sloped cam surface and the coupling members fully engaged.
Figure 6:
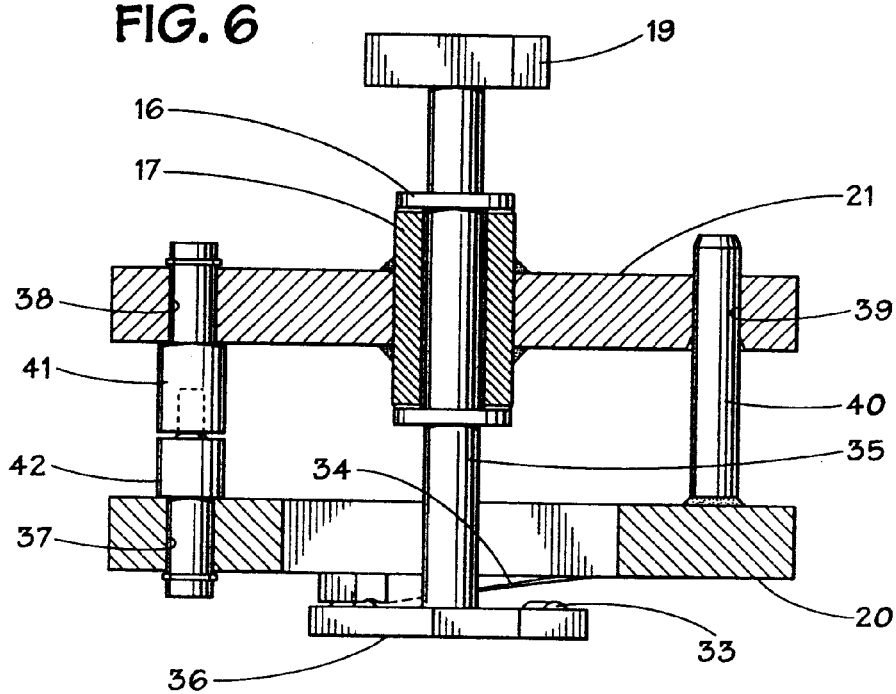
FIG. 6 is a side view, in cross section, of the junction plate assembly according to a preferred embodiment with each cam follower at the end of the sloped cam surface and the male and female coupling members fully engaged.

FIGS. 3 and 4 show the upper and lower manifold plates after the central shaft has been rotated approximately 60 degrees, and FIGS. 5 and 6 show the plates after the central shaft has been rotated approximately 120 degrees. In a preferred embodiment, detents are provided in the sloped cam surfaces at the ends thereof. When the cam followers 31, 33 reach detents 51, 50, this helps restrain further movement of the manifold or junction plates, and helps maintain the coupling members in the fully engaged position, as shown in FIGS. 5 and 6.

The present invention may be used either manually or by a remote operating vehicle to move the faces of the manifold or junction plates together and engage couplings, or to separate the faces of the manifold or junction plates and disengage the couplings. The central shaft rotates and urges the plates together as one or more cam followers moves 120 degrees around the central shaft, bringing the male and female coupling members together. The present invention may be used with undersea hydraulic couplers of the type described in U.S. Patents owned by National Coupling Company, Inc. in Stafford, Tex.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. A junction plate assembly for undersea hydraulic couplings comprising:
    (a) a first junction plate having a plurality of male hydraulic coupling members mounted thereto; the first junction plate having at least one sloped cam surface on one face thereof;
    (b) a second junction plate in spaced relation to the first junction plate and having a plurality of female coupling members mounted thereto; and
    (c) a central shaft extending between the first and second junction plates, the central shaft rotating on an axis perpendicular to the faces of the first and second junction plates, the central shaft having at least one cam follower on one end thereof, the cam follower positioned to ride on the sloped cam surface upon rotation of the central shaft to change the spaced relation between the faces of the first and second junction plates.

2. The junction plate assembly of claim 1 wherein the sloped cam surface forms an arc on one face of the first junction plate.

3. The junction plate assembly of claim 1 wherein the second junction plate includes a central sleeve through which the central shaft extends, and the central shaft has at least one flange to limit axial movement of the central shaft with respect to the second junction plate.

4. The junction plate assembly of claim 1 comprising two sloped cam surfaces and two cam followers.

5. The junction plate assembly of claim 1 wherein the cam follower is attached to an arm positioned on one end of the central shaft.

6. The junction plate assembly of claim 1 further comprising at least one guide pin extending from the face of one of the junction plates, and at least one aperture in the other junction plate for insertion of the guide pin therein.

7. An apparatus for varying the spacing between first and second manifold plates having a plurality of hydraulic coupling members mounted to the face of each manifold plate, comprising:

(a) a pair of sloped cam surfaces on the first manifold plate, each of the sloped cam surfaces forming an arcuate path along the face of the first manifold plate;

(b) a central shaft extending between the first and second manifold plates perpendicular to the face of each manifold plate, the central shaft rotating on its axis perpendicular to the face of each manifold plate, the central shaft having an arm section on one end thereof adjacent the face of the first manifold plate, the central shaft having at least one flange adjacent the face of the second manifold plate blocking axial movement of the second manifold plate along the axis of the central shaft; and (c) a pair of cam followers mounted to the arm section of the central shaft, the cam followers positioned to ride in the pair of sloped cam surfaces during axial rotation of the central shaft whereby spacing between the faces of the first and second manifold plates may be varied.

8. The apparatus of claim 7 wherein each sloped cam surface forms an arc of 120 degrees along the face of the first manifold plate.

9. The apparatus of claim 7 further comprising at least one guide pin on one of the manifold plates and at least one aperture in the other manifold plate for insertion of the guide pin therein.

10. The apparatus of claim 7 further comprising a sleeve attached to the second manifold plate through which the central shaft extends, the flange on the central shaft abutting the sleeve to block axial movement of the second manifold plate with respect to the central shaft.

11. The apparatus of claim 7 wherein each of the sloped cam surfaces includes detents adjacent at least one end thereof.

12. An apparatus for engaging or disengaging a plurality of hydraulic coupling members mounted to the faces of opposing first and second junction plates, comprising:

(a) a central shaft having a first end and a second end, the central shaft extending through an aperture in each of the first and second junction plates, the central shaft being perpendicular to the faces of the first and second junction plates and having at least one flange intermediate the central shaft adjacent the face of the second junction plate, the second end of the central shaft including a member perpendicular to the shaft with a cam follower attached to the member; and (b) a sloped cam surface forming an arc along the face of the first junction plate, the cam follower configured to ride on the sloped cam surface to move the first junction plate axially along the central shaft when the central shaft is rotated while the flange on the central shaft restricts axial movement of the second junction plate with respect to the central shaft.

13. The apparatus of claim 12 further comprising a second cam follower attached to the shaft and a second sloped cam surface forming an arc along the face of the first junction plate.

14. The apparatus of claim 12 wherein the sloped cam surface forms an arc of 120 degrees.

15. The apparatus of claim 12 further comprising a sleeve on the second junction plate adjacent the flange.

16. The apparatus of claim 12 further comprising a guide pin attached to one of the junction plates and an aperture configured to receive the guide pin on the other junction plate.

* * * * *